(12) United States Patent
Liao

(10) Patent No.: US 11,280,330 B2
(45) Date of Patent: Mar. 22, 2022

(54) PUMPING DEVICE

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

(*) Notice: Subject to any disclaimer, the term of this patent is extended or adjusted under 35 U.S.C. 154(b) by 403 days.

(21) Appl. No.: 16/542,976

(22) Filed: Aug. 16, 2019

(65) Prior Publication Data
US 2021/0048015 A1   Feb. 18, 2021

(51) Int. Cl.
*F04B 47/02* (2006.01)
*F16N 31/00* (2006.01)
*F01M 11/04* (2006.01)

(52) U.S. Cl.
CPC ....... *F04B 47/024* (2013.01); *F01M 11/0458* (2013.01); *F16N 31/00* (2013.01); *F01M 11/045* (2013.01); *F16N 2210/04* (2013.01)

(58) Field of Classification Search
CPC . F01M 11/0458; F01M 11/045; F04B 47/024; F04B 9/14; F04B 53/16; F04B 39/14; F16N 31/00; F16N 2210/04
USPC ........................................ 184/28; 137/565.25
See application file for complete search history.

(56) References Cited

U.S. PATENT DOCUMENTS

| | | | | |
|---|---|---|---|---|
| 3,972,387 A * | 8/1976 | Braun | ........................ | F04B 9/14 184/28 |
| 5,074,380 A * | 12/1991 | Bedi | .................. | F01M 11/0458 184/1.5 |
| 5,353,951 A * | 10/1994 | Kusz | ................... | F01M 11/0458 220/23.83 |
| 5,375,703 A * | 12/1994 | Deuber | ..................... | B65F 1/06 141/98 |
| 5,450,924 A * | 9/1995 | Tseng | .................... | F01M 11/045 137/202 |
| 6,357,492 B1* | 3/2002 | Hsu | ....................... | B67D 7/0205 137/565.25 |
| 6,450,252 B1* | 9/2002 | Liao | .................... | F01M 11/0458 165/154 |
| 8,240,433 B2* | 8/2012 | Tseng | ........................ | F04B 9/14 184/1.5 |
| 8,419,376 B2* | 4/2013 | Sun | ......................... | F04B 33/00 417/118 |

(Continued)

*Primary Examiner* — Michael R Mansen
*Assistant Examiner* — Mark K Buse
(74) *Attorney, Agent, or Firm* — Muncy, Geissler, Olds & Lowe, P.C.

(57) ABSTRACT

The pumping device includes a barrel, a cover, a pumping mechanism, a positioning ring, and plural posts. The barrel has plural first positioning portions extending upward near a bottom thereof. The cover is disposed on the barrel to selectively close the barrel. The pumping mechanism is disposed on the cover for pumping liquid in the receiving space outward or pumping liquid outside into the receiving space. The positioning ring is detachably combined by two semi-ring bodies and is sleeved onto the cover and the barrel to position the cover on the barrel. The positioning ring has plural second positioning portions. Each of the posts connects the positioning ring and the bottom of the barrel therebetween. Each post is detachably connected to one of the first positioning portions and one of the second positioning portions therebetween so that the two semi-ring bodies are unable to separate freely.

9 Claims, 5 Drawing Sheets

(56) References Cited

U.S. PATENT DOCUMENTS

| | | | | |
|---|---|---|---|---|
| 8,905,984 | B2* | 12/2014 | Romano | G06Q 30/0223 |
| | | | | 604/317 |
| 9,222,471 | B2* | 12/2015 | Liao | F04B 33/00 |
| D885,440 | S* | 5/2020 | Chen | D15/7 |
| 10,641,254 | B2* | 5/2020 | Liao | B67D 7/0205 |
| 10,807,112 | B2* | 10/2020 | Liao | B67D 7/42 |
| 11,073,140 | B2* | 7/2021 | Chen | F04B 33/00 |
| 2007/0023365 | A1* | 2/2007 | Liao | F04F 3/00 |
| | | | | 210/776 |
| 2015/0017026 | A1* | 1/2015 | Liao | F04B 39/14 |
| | | | | 417/63 |
| 2018/0328353 | A1* | 11/2018 | Timm | A61M 1/743 |
| 2019/0309739 | A1* | 10/2019 | Liao | F04B 9/14 |
| 2021/0172349 | A1* | 6/2021 | Chen | F04B 53/001 |
| 2021/0301816 | A1* | 9/2021 | Jang | F04C 2/107 |
| 2021/0332808 | A1* | 10/2021 | Chang | F04B 9/14 |

* cited by examiner

PUMPING DEVICE

BACKGROUND OF THE INVENTION

Field of the Invention

The present invention relates to a pumping device.

Description of the Prior Art

Generally, a pumping device is often used to drain out the old oil in the vehicle and to refill the oil into the vehicle when changing oil. The pumping device can be handheld or floor-standing. It is inconvenient that the handheld type pumping device has to be held by one hand, and that the piston is operated by the other hand. The barrel of the floor-standing type pumping device is placed on the floor and is connected to the oil tank via pipes. This type of pumping device also uses the piston to pumping the liquid.

The floor-standing type of pumping device usually includes the barrel and the cover. When the barrel accidentally falls down, the cover may separate from the barrel to make the liquid in the barrel spill or to make the barrel damage. Besides, the floor-standing type of pumping device further includes a plurality of pipes for operation. It becomes a problem to store the pipes.

SUMMARY OF THE INVENTION

The main object of the present invention is to provide a pumping device having protection on a connection between the cover and the barrel. In addition, the force on the cover during pumping can be dispersed.

To achieve the above and other objects, the pumping device of the present invention includes a barrel, a cover, a pumping mechanism, a positioning ring, and a plurality of posts.

The barrel encloses a receiving space and has an opening at a top thereof. The barrel further has a plurality of first positioning portions extending upward at a lateral side thereof near a bottom thereof. An axial direction is defined from the top to the bottom of the barrel. The cover is disposed on the barrel at the opening of the barrel to selectively close the receiving space. The pumping mechanism is disposed on the cover and communicates the receiving space and an outside therebetween. The pumping mechanism is adapted for pumping liquid in the receiving space outward or pumping liquid outside into the receiving space. The positioning ring is detachably combined by two semi-ring bodies. The positioning ring is sleeved onto a portion that the cover and the barrel are connected so as to position the cover on the barrel to inhibit the cover from detaching from the barrel along the axial direction. The positioning ring has a plurality of second positioning portions. Each of the two semi-ring bodies has at least one said second positioning portion. Each of the posts connects the positioning ring and the bottom of the barrel therebetween. Two ends of each of the posts are detachably connected to one of the first positioning portions and one of the second positioning portions so that the two semi-ring bodies are unable to separate freely.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
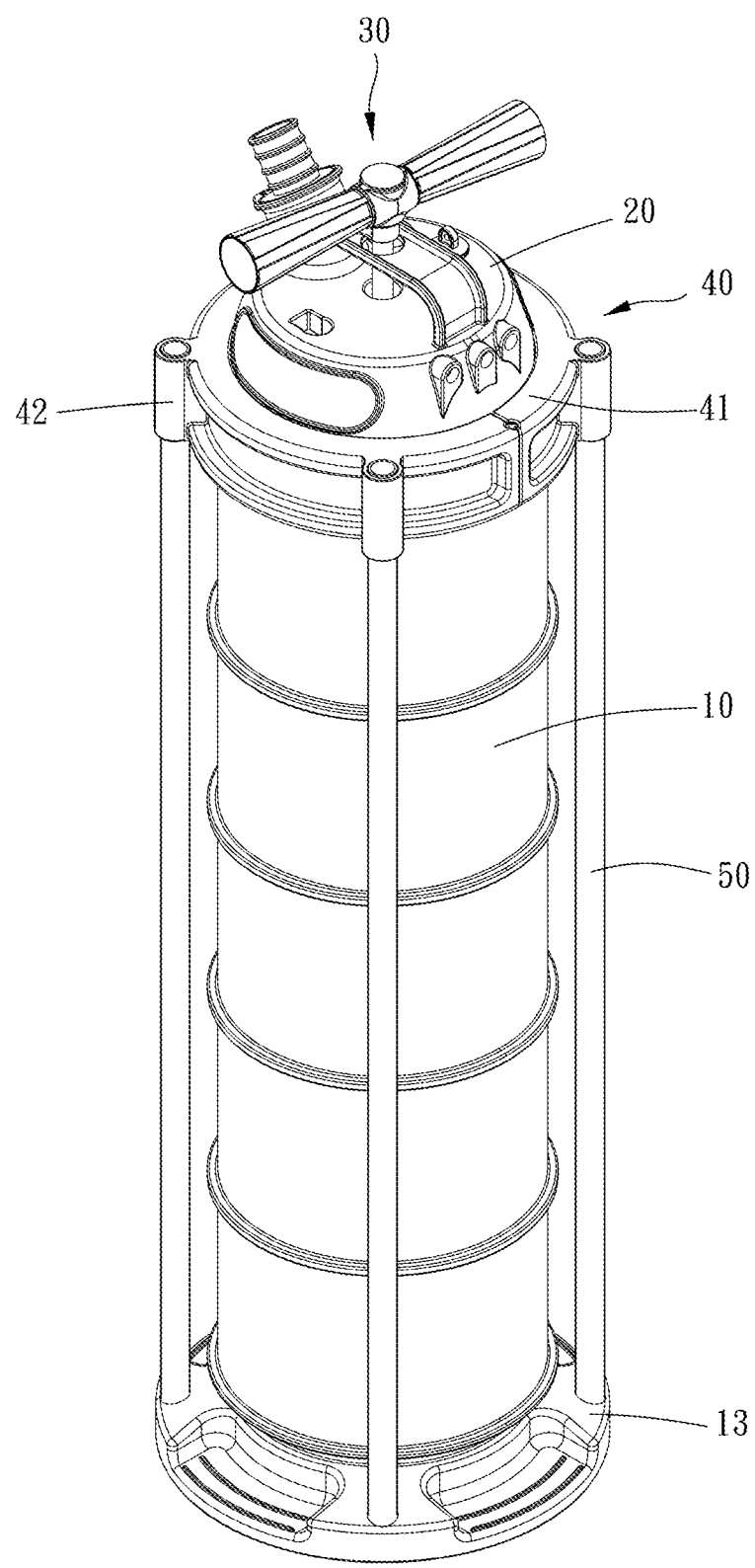
FIG. 1 is a stereogram of the present invention.
Figure 2:
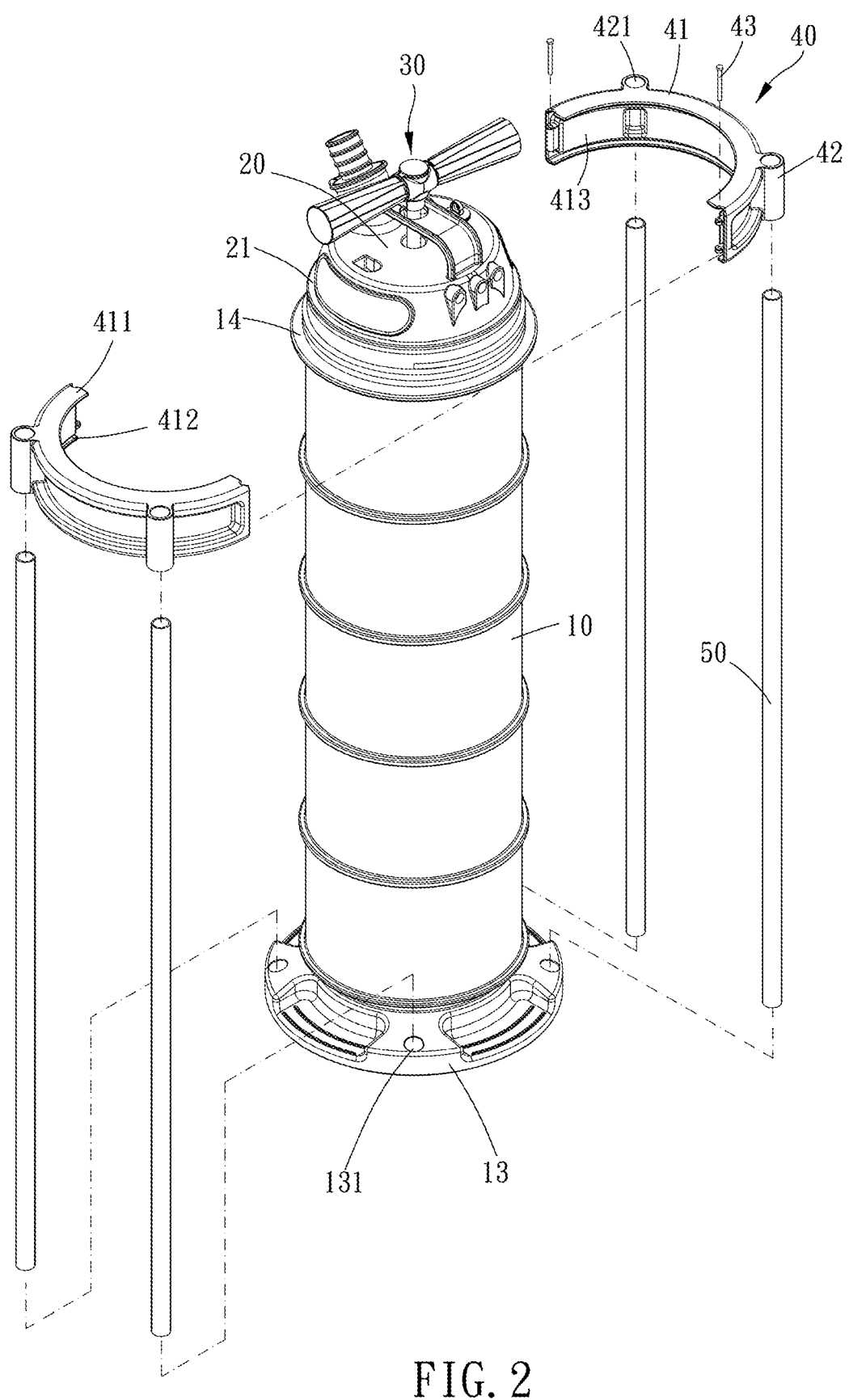
FIG. 2 is a breakdown drawing of the present invention.
Figure 3:
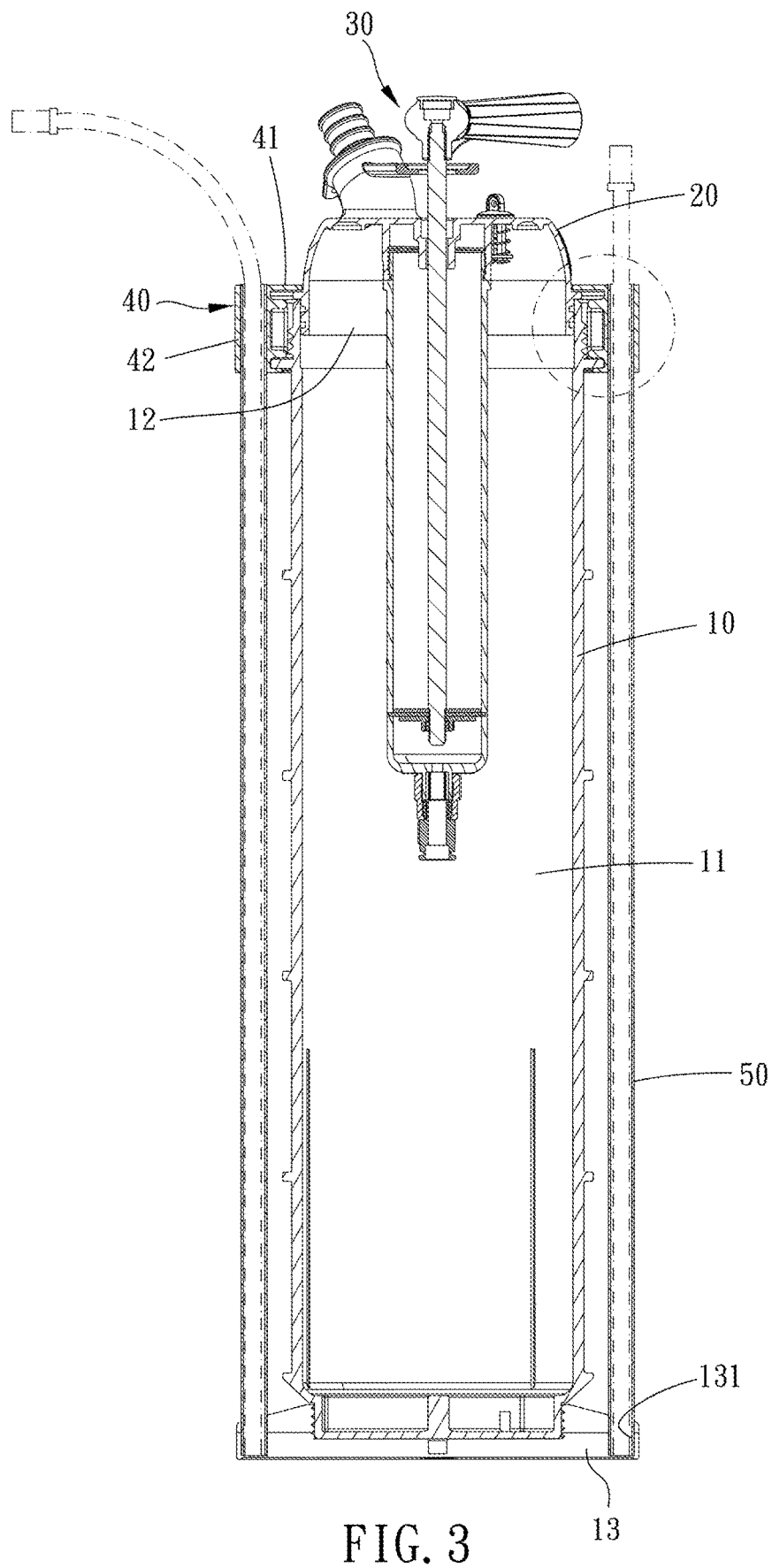
FIG. 3 is a profile of the present invention.
Figure 4:
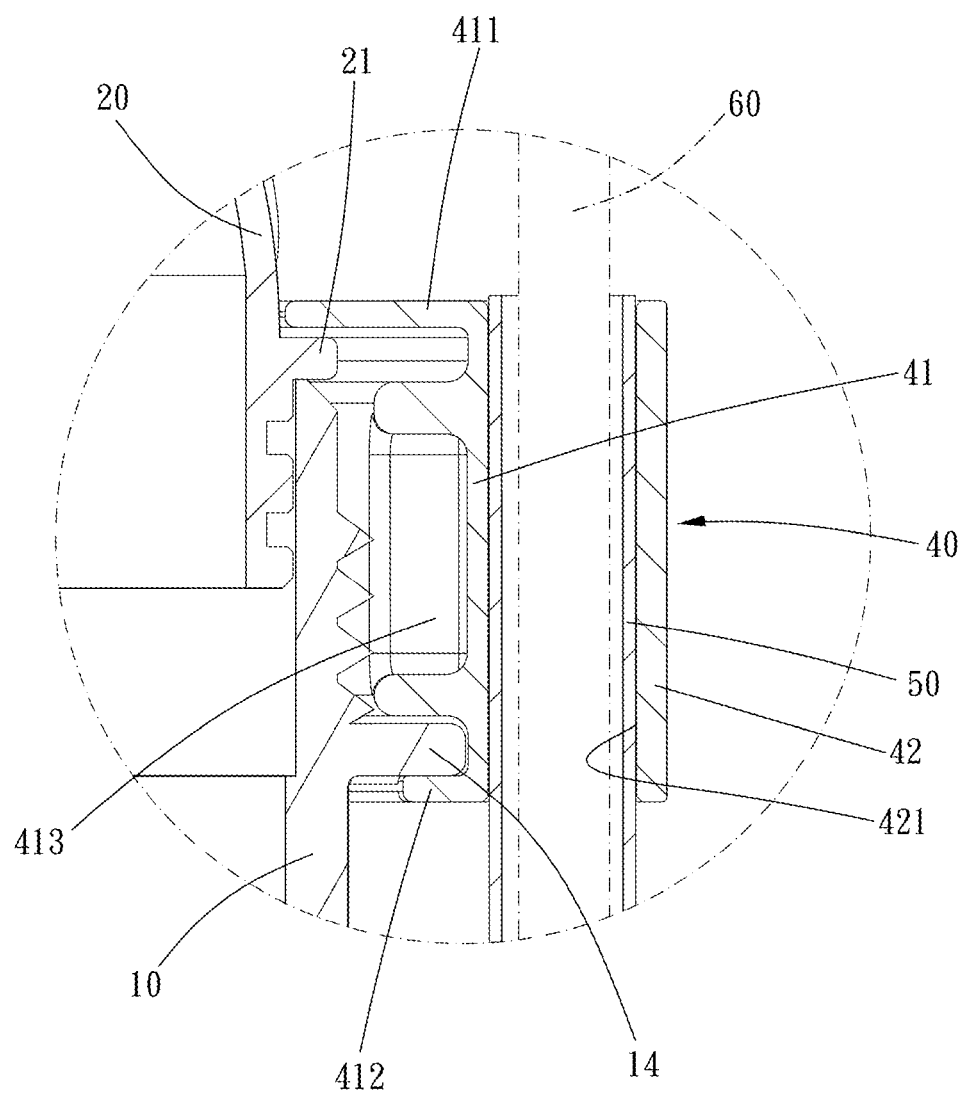
FIG. 4 is a partial enlargement of FIG. 3.
Figure 5:
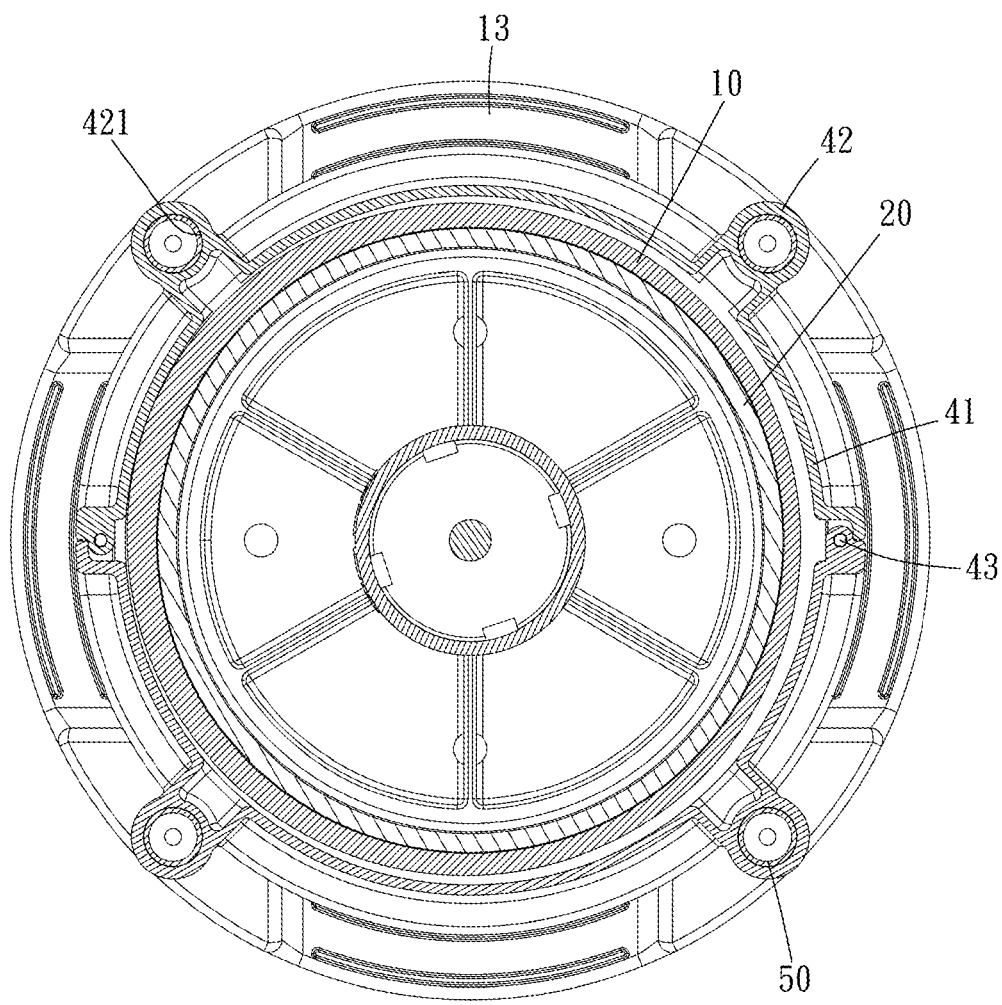
FIG. 5 is a profile of the present invention at an other angle.

Please refer to FIG. 1 to FIG. 5, the pumping device of the present invention includes a barrel 10, a cover 20, a pumping mechanism 30, a positioning ring 40, and a plurality of posts 50.

The barrel 10 encloses a receiving space 11 and has an opening 12 at a top thereof. The barrel 10 further has a plurality of first positioning portions 131 extending upward at a lateral side thereof near a bottom thereof. An axial direction is defined from the top to the bottom of the barrel 10. The cover 20 is disposed on the barrel 10 at the opening 12 of the barrel 10 to selectively close the receiving space 11. The pumping mechanism 30 is disposed on the cover 20 and communicates the receiving space 11 and an outside therebetween. The pumping mechanism 30 is adapted for pumping liquid in the receiving space 11 outward or pumping liquid outside into the receiving space 11. The positioning ring 40 is detachably combined by two semi-ring bodies 41. For example, the two semi-ring bodies 41 can be penetrated by two pivot elements 43 for detachably connected. The positioning ring 40 is sleeved onto a portion that the cover 20 and the barrel 10 are connected so as to position the cover 20 on the barrel 10 to inhibit the cover 20 from detaching from the barrel 10 along the axial direction. The positioning ring 40 has a plurality of second positioning portions 421. Each of the two semi-ring bodies 41 has at least one said second positioning portion 421. Each of the posts 50 connects the positioning ring 40 and the bottom of the barrel 10 therebetween. Two ends of each of the posts 50 are detachably connected to one of the first positioning portions 131 and one of the second positioning portions 421 so that the two semi-ring bodies 41 are unable to separate freely. Preferably, the first positioning portions 131 include four said first positioning portions 131 arranged isometrically. The second positioning portions 421 include four said second positioning portions 421, and each of the semi-ring bodies 41 has two of said second positioning portions 421. The posts 50 includes four said posts 50.

Specifically, each of the first positioning portions 131 is a recess extending along the axial direction, and each of the second positioning portions 421 is a through hole extending along the axial direction and penetrating the positioning ring 40. In the present embodiment, each of the semi-ring bodies 41 is formed with at least one protrusion 42 radially extending outward. The protrusions 42 are arranged isometrically. The through holes of the second positioning portions 421 are formed on the protrusions 42 respectively. Preferably, the barrel 10 has a seat 13 located at the bottom of the barrel 10 and having a larger diameter than that of the barrel 10 to have a portion radially extending outward. The first positioning portions 131 are located at the portion of the seat 13 radially extending outward.

Preferably, each of the posts 50 is hollow tube-shaped. Thereby, the pipes 60 for connecting to the pumping mechanism 30 can be inserted into the posts 50 for storing to prevent the pipes from missing or fluid on the pipes falling.

More specifically, the cover 20 has a first flange 21 radially extending outward, and the barrel 10 has a second flange 14 radially extending outward near the opening 12. An inner peripheral face of each of the semi-ring bodies 41 has a first rib 411 and a second rib 412 at two ends along the axial direction. The first rib 411 and the second rib 412 radially extend inward. The first rib 411 is located above the first flange 21 and overlaps the first flange 21 along the axial direction. The second rib 412 is located below the second flange 14 and overlaps the second flange 14 along the axial direction so that the cover 20 is positioned on the barrel 10. That is, the first flange 21 and the second flange 14 are restricted between the first rib 411 and the second rib 412. More preferably, the inner peripheral face of each of the semi-ring bodies 41 is further formed with a third rib 413 located between the first rib 411 and the second rib 412. The third rib 413 is located above the second flange 14 so that the second flange 14 is restricted between the second rib 412 and the third rib 413. Thereby, the connection with the barrel 10 is enhanced.

In use, the cover 20 can be disposed on the barrel 10 by screwing or other means. The lower ends of the posts 50 are inserted into the first positioning portions 131 respectively, and the upper ends of the posts 50 are inserted through the second positioning portions 421 respectively. Thereafter, the two semi-ring bodies 41 are sleeved onto the connected portion of the cover 20 and the barrel 10 to make the first flange 21 and the second flange 14 are restricted between the first rib 411 and the second rib 412. And then, the two semi-ring bodies 41 are positioned by the pivot elements 43. Thereby, the cover 20 is unable to separate from the barrel 10 freely if the two semi-ring bodies 41 are not separated apart. To detach the cover 20, at least one of the pivot elements 43 has to be removed to allow the two semi-ring bodies 41 to pivot and open. Thereby, the first flange 21 and the second flange 14 are not restricted by the first rib 411 and the second rib 412. Thus, the cover 20 can be detached from the barrel 10. Preferably, the two semi-ring bodies 41 are removed from the posts 50 to allow the two semi-ring bodies 41 to separate from the cover 20 completely to remove the cover 20 easier.

In conclusion, the present invention has the positioning ring to enhance the connection between the cover and the barrel so that the cover is unable to separate from the barrel freely. Thereby, the cover may not separate from the barrel even if the barrel falls down. Besides, the posts connected between the positioning ring and the bottom of the barrel so that the shape of the positioning ring is further restricted. In addition, the positioning ring helps disperse the force during pumping the liquid and provides protection when the barrel falls down to prevent the barrel from damaging. On the other hand, the posts can be used to store the pipes to avoid the pipes from missing and to prevent the liquid on the pipes from dripping.

What is claimed is:

1. A pumping device, including:
   a barrel, enclosing a receiving space and having an opening at a top thereof, the barrel further having a plurality of first positioning portions extending upward at a lateral side thereof near a bottom thereof, an axial direction being defined from the top to the bottom of the barrel; a cover, disposed on the barrel at the opening of the barrel to selectively close the receiving space;
   a pumping mechanism, disposed on the cover and communicating the receiving space and an outside therebetween, the pumping mechanism being adapted for pumping liquid in the receiving space outward or pumping liquid outside into the receiving space;
   a positioning ring, detachably combined by two semi-ring bodies, the positioning ring being sleeved onto a portion that the cover and the barrel are connected so as to position the cover on the barrel to inhibit the cover from detaching from the barrel along the axial direction, the positioning ring having a plurality of second positioning portions, each of the two semi-ring bodies having at least one said second positioning portions;
   a plurality of posts, each of the posts connecting the positioning ring and the bottom of the barrel therebetween, two ends of each of the posts being detachably connected to one of the first positioning portions and one of the second positioning portions so that the two semi-ring bodies are unable to separate freely.

2. The pumping device of claim 1, wherein each of the posts is hollow tube-shaped.

3. The pumping device of claim 1, wherein each of the first positioning portions is a recess extending along the axial direction, each of the second positioning portions is a through hole penetrating the positioning ring and extending along the axial direction.

4. The pumping device of claim 3, wherein each of the semi-ring bodies is formed with at least one protrusion radially extending outward, each of the second positioning portions is formed on one of the protrusions.

5. The pumping device of claim 1, wherein the barrel has a seat arranged at the bottom thereof, the seat has a larger diameter than that of the barrel, the first positioning portions are arranged on a top face of the seat.

6. The pumping device of claim 1, wherein the two semi-ring bodies are penetrated by two pivot elements to be detachably connected.

7. The pumping device of claim 1, wherein the cover has a first flange radially extending outward, the barrel has a second flange radially extending outward near the opening, an inner peripheral face of each of the semi-ring bodies has a first rib and a second rib at two ends along the axial direction, the first rib and the second rib radially extend inward, the first rib is located above the first flange and overlaps the first flange along the axial direction, the second rib is located below the second flange and overlaps the second flange along the axial direction so that the cover is positioned on the barrel.

8. The pumping device of claim 7, wherein the inner peripheral face of each of the semi-ring bodies is further formed with a third rib located between the first rib and the second rib, the third rib is located above the second flange so that the second flange is restricted between the second rib and the third rib.

9. The pumping device of claim 8, wherein each of the posts is hollow tube-shaped; each of the first positioning portions is a recess extending along the axial direction, each of the second positioning portions is a through hole penetrating the positioning ring and extending along the axial direction; the barrel has a seat arranged at the bottom thereof, the seat has a larger diameter than that of the barrel, the first positioning portions are arranged on a top face of the seat; the two semi-ring bodies are penetrated by two pivot elements to be detachably connected; the first positioning portions includes four said first positioning portions arranged isometrically, the second positioning portions includes four said second positioning portions, each of the semi-ring bodies includes two of the second positioning portions, the posts includes four said posts.

\* \* \* \* \*